(12) United States Patent
Hong

(10) Patent No.: US 11,300,786 B2
(45) Date of Patent: Apr. 12, 2022

(54) DISPLAY APPARATUS, DISPLAY METHOD THEREOF, AND HEAD-UP DISPLAY APPARATUS

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 432 days.

(21) Appl. No.: 16/344,520

(22) PCT Filed: Sep. 19, 2018

(86) PCT No.: PCT/CN2018/106478
§ 371 (c)(1),
(2) Date: Apr. 24, 2019

(87) PCT Pub. No.: WO2019/134401
PCT Pub. Date: Jul. 11, 2019

(65) Prior Publication Data
US 2021/0333545 A1    Oct. 28, 2021

(30) Foreign Application Priority Data
Jan. 2, 2018 (CN) .......................... 201810002318.1

(51) Int. Cl.
*G02B 27/01* (2006.01)
*G02F 1/137* (2006.01)
(Continued)

(52) U.S. Cl.
CPC ....... *G02B 27/0101* (2013.01); *G02B 5/3083* (2013.01); *G02B 27/283* (2013.01);
(Continued)

(58) Field of Classification Search
CPC .......... B82Y 20/00; G09G 2310/0235; G09G 2310/06; G09G 2310/0209; G02F 1/29;
(Continued)

(56) References Cited

U.S. PATENT DOCUMENTS 4,688,900 A * 8/1987 Doane .................... C09K 19/00
349/87
5,760,860 A * 6/1998 Mason .............. G02F 1/133533
349/86
(Continued)

FOREIGN PATENT DOCUMENTS

CN    102162924 A    8/2011
CN    102326113 A    1/2012
(Continued)

OTHER PUBLICATIONS

Office Action dated Dec. 6, 2019, issued in counterpart CN application No. 201810002318.1, with English translation.(15 pages).
(Continued)

*Primary Examiner* — Dawayne Pinkney
(74) *Attorney, Agent, or Firm* — WHDA, LLP

(57) ABSTRACT

A display apparatus includes a display unit (2) and an image processing unit (3). The display unit may be configured to project light for a display image. The image processing unit may be configured to change polarization direction of the light for the display image and to selectively scatter or transmit the light for the display image based on the polarization direction of the light for the display image.

18 Claims, 11 Drawing Sheets

(51) Int. Cl.
*G02B 5/30* (2006.01)
*G02B 27/28* (2006.01)
*G02F 1/29* (2006.01)
*G03H 1/00* (2006.01)
*G02B 26/00* (2006.01)
*G02F 1/03* (2006.01)

(52) U.S. Cl.
CPC ....... *G02B 27/286* (2013.01); *G02F 1/13756* (2021.01); *G02B 2027/014* (2013.01); *G02B 2027/0185* (2013.01)

(58) Field of Classification Search
CPC ... G02F 1/03; G02F 1/055; G02F 1/07; G02F 1/134309; G02F 1/1368; G02F 1/1334; G02F 1/137; G02F 1/136286; G02F 1/1362; G02F 2201/121; G02F 2201/123; G02B 26/001; G02B 26/0841; G02B 27/0103; G02B 6/004; G02B 6/0041; G02B 6/0016; G02B 6/011; G02B 6/0026; G02B 6/0063
USPC ......... 359/315, 237, 298, 13, 245, 247, 252, 359/253
See application file for complete search history.

(56) References Cited

U.S. PATENT DOCUMENTS

| | | | |
|---|---|---|---|
| 6,177,965 B1* | 1/2001 | Takahara | G02F 1/136213 349/5 |
| 9,366,864 B1 | 6/2016 | Brown et al. | |
| 9,791,695 B2 | 10/2017 | Ting et al. | |
| 2008/0316606 A1 | 12/2008 | Inoguchi et al. | |
| 2012/0002294 A1 | 1/2012 | Dobschal et al. | |
| 2013/0182197 A1 | 7/2013 | Ludewig et al. | |
| 2013/0314628 A1 | 11/2013 | Park et al. | |
| 2015/0062345 A1 | 3/2015 | Kusanagi | |
| 2015/0226965 A1 | 8/2015 | Kim et al. | |
| 2016/0018672 A1 | 1/2016 | Wang | |
| 2016/0109714 A1 | 4/2016 | Chen | |
| 2016/0131903 A1 | 5/2016 | Kollin | |
| 2017/0146803 A1 | 5/2017 | Kishigami et al. | |
| 2017/0227770 A1 | 8/2017 | Carollo et al. | |
| 2017/0336628 A1 | 11/2017 | Kim et al. | |
| 2018/0210199 A1 | 7/2018 | Yokoe et al. | |
| 2019/0285883 A1 | 9/2019 | Cui | |

FOREIGN PATENT DOCUMENTS

| | | |
|---|---|---|
| CN | 103003736 A | 3/2013 |
| CN | 103792671 A | 5/2014 |
| CN | 104827967 A | 8/2015 |
| CN | 106291929 A | 1/2017 |
| CN | 106353884 A | 1/2017 |
| CN | 106873169 A | 6/2017 |
| CN | 107045199 A | 8/2017 |
| CN | 107148592 A | 9/2017 |
| CN | 107422477 A | 12/2017 |
| CN | 107422484 A | 12/2017 |
| EP | 3 118 667 A1 | 1/2017 |
| JP | 2014-191321 A | 10/2014 |
| JP | 2017-044858 A | 3/2017 |
| KR | 20010096885 A | 11/2001 |
| WO | 2012/118573 A1 | 9/2012 |
| WO | 2017/084894 A1 | 5/2017 |

OTHER PUBLICATIONS

International Search Report dated Dec. 26, 2018, issued in counterpart Application No. PCT/CN2018/106478 (10 pages).
Office Action dated May 7, 2020, issued in counterpart CN application No. 201810002318.1, with English translation. (7 pages).
Extended (Supplementary) European Search Report dated Sep. 13, 2021, issued in counterpart EP application No. 18880060.1. (9 pages).

* cited by examiner

DISPLAY APPARATUS, DISPLAY METHOD THEREOF, AND HEAD-UP DISPLAY APPARATUS

CROSS-REFERENCE TO RELATED APPLICATIONS

This application claims benefit of the filing date of Chinese Patent Application No. 201810002318.1 filed on Jan. 2, 2018, the disclosure of which is hereby incorporated in its entirety by reference.

TECHNICAL FIELD

This invention relates to display technology, and more particularly, to a display apparatus, a display method thereof, and a head-up display apparatus.

BACKGROUND

Head-Up Display (HUD) has gradually gained wide application in the automotive field. Head-up display projects important information such as speed and navigation displayed on the meter onto the front windshield during the driving so that the driver can see the information on the meter without looking down. This helps a novice driver to control the driving speed and to avoid speeding on a speed-limited road. More importantly, this enables the driver to read instantly the information without changing the view field and to always maintain the best observation. This also enables the driver not to have to look down to watch the instrument display or audio display during the driving. Otherwise, when an emergency occurs in the front, the driver may not have enough time to take effective measures, which may lead to an accident.

BRIEF SUMMARY

Accordingly, one example of the present disclosure is a display apparatus. The display apparatus may include a display unit and an image processing unit. The display unit may be configured to project light for a display image. The image processing unit may be configured to change polarization direction of the light for the display image and to selectively scatter or transmit the light for the display image based on the polarization direction of the light for the display image. The display apparatus may be configured to display the display image at different distances from a user.

The image processing unit may include a first polarization conversion element, a first lens element, and a liquid crystal dispersing element. The first polarization conversion element may be configured to convert the polarization direction of the light for the display image into a first polarization direction or a second polarization direction. The first lens element may be configured to deflect the light of the first polarization direction and not to change direction of the light of the second polarization direction. The liquid crystal dispersing element may be configured to scatter the light of the first polarization direction and transmit the light of the second polarization direction.

The image processing unit may further include a first polarization beam splitter. The first polarization beam splitter may be configured to receive the light of the first polarization direction scattered by the liquid crystal dispersing element or the light of the second polarization direction transmitted by the liquid crystal dispersing element, and to cause an exit direction of the light of the first polarization direction to be different from an exit direction of the light of the second polarization direction.

The image processing unit may include a second polarization conversion element, a second lens element, a second polarization beam splitter, and a scattering element. The second polarization conversion element may be configured to convert the polarization direction of the light for the display image into a first polarization direction or a second polarization direction. The second lens element may be configured to deflect the light of the first polarization direction and not to change direction of the light of the second polarization direction. The scattering element may be configured to scatter the light of the first polarization direction emitted by the second polarization beam splitter.

The display unit may project light for a first display image, light for a second display image, or light for the first display image and light for the second display image alternatively according to a timing diagram. In case that the display unit projects the light for the first display image, the first polarization conversion element or the second polarization conversion element may convert the polarization direction of the light for the first display image into the first polarization direction, and in case that the display unit projects the light for the second display image, the first polarization conversion element or the second polarization conversion element may convert the polarization direction of the light for the second display image into the second polarization direction.

The display apparatus may further include a control unit. The liquid crystal dispersing element may include a polymer dispersed liquid crystal element. The control unit may be configured to turn on the polymer dispersed liquid crystal element to scatter the light of the first polarization direction or turn off the polymer dispersed liquid crystal element to transmit the light of the second polarization direction. The first lens element may include a birefringent lens. The birefringent lens may include a hollow refractive material and a filler. A refractive index of the hollow refractive material may be smaller than that of the filler with respect to incident light of the first polarization direction, and the refractive index of the hollow refraction material may be the same as that of the filler with respect to incident light of the second polarization direction.

The display apparatus may further include a first reflection unit including a first mirror assembly. The first reflection unit may be configured to reflect the light of the first polarization direction scattered by the liquid crystal dispersion element and/or the light of the second polarization direction transmitted through the liquid crystal dispersion element to form the display image at different distances from an user, respectively.

The display apparatus may further include a second reflection unit including a second mirror assembly and a third mirror assembly. The second mirror assembly may be configured to reflect the light of the first polarization direction emitted by the first polarization beam splitter to form the display image. The third mirror assembly may be configured to reflect the light of the second polarization direction emitted by the first polarization beam splitter to the second mirror assembly.

The display apparatus may further include a third reflection unit including a fourth mirror assembly and a fifth mirror assembly. The fourth mirror assembly may be configured to reflect the light of the first polarization direction scattered by the scattering element to form the display image. The fifth mirror assembly may be configured to reflect the light of the second polarization direction emitted by the second polarization beam splitter to the fourth mirror assembly.

The display apparatus may further include a mode selection unit. The mode selection unit may be configured to select a display mode, the display mode including a first distance display mode, a second distance display mode, and a dual-distance display mode. In the first distance display mode, the display unit may project light for a first display image. The image processing unit may convert polarization direction of the light for the first display image into the first polarization direction and scatter the light for the first display image to display the first display image at a first distance. In the second distance display mode, the display unit may project light for a second display image. The image processing unit may convert the polarization direction of the light for the second display image into the second polarization direction and transmit the light for the second display image to display the second display image at a second distance. In the dual-distance display mode, the display unit may project light for the first display image and light for the second display image alternatively, and the image processing unit may display the first display image and the second display image at the first distance and the second distance, respectively.

Another example of the present disclosure is a display method. The display method may include projecting a light for a display image and changing polarization direction of the light for the display image and selectively scattering or transmitting the light for the display image based on the polarization direction of the light for the display image. In one embodiment, changing polarization direction of the light for the display image and selectively scattering or transmitting the light for the display image based on the polarization direction of the light for the display image may include converting the polarization direction of the light for the display image into a first polarization direction or a second polarization direction, deflecting the light of the first polarization direction and/or maintaining the direction of the light of the second polarization direction, and scattering the deflected light of the first polarization direction and/or transmitting the light of the second polarization direction. In another embodiment, changing polarization direction of the light for the display image and selectively scattering or transmitting the light for the display image based on the polarization direction of the light for the display image may include converting the polarization direction of the light for the display image into a first polarization direction or a second polarization direction, deflecting the light of the first polarization direction and/or maintaining the direction of the light of the second polarization direction, causing an exit direction of the light of the first polarization direction to be different from an exit direction of the light of the second polarization direction, and scattering the light of the first polarization direction.

In one embodiment, the display image may include a first display image and a second display image. The display method may include projecting a light for the first display image, a light for the second display image, or the light for the first display image and the light for the second display image alternatively, converting polarization direction of the light for the first display image into the first polarization direction in case that the light for the first display image is projected, converting polarization direction of the light for the second display image into the second polarization direction in case that the light for the second display image is projected.

The display method may further include selecting one of display modes. The display modes may include a first distance display mode, a second distance display mode, and a dual-distance display mode. In the first distance display mode, the display unit may project the light for the first display image. The image processing unit may convert polarization direction of the light for the first display image into the first polarization direction and scatter the light for the first display image to display the first display image at a first distance. In the second distance display mode, the display unit may project the light for the second display image. The image processing unit may convert the polarization direction of the light for the second display image into the second polarization direction and transmit the light for the second display image to display the second display image at a second distance. In the dual-distance display mode, the display unit may project the light for the first display image and the light for the second display image alternatively, and the image processing unit may display the first display image and the second display image at the first distance and the second distance respectively.

Another example of the present disclosure is a head-up display apparatus comprising the display apparatus according to one embodiment of the present disclosure.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
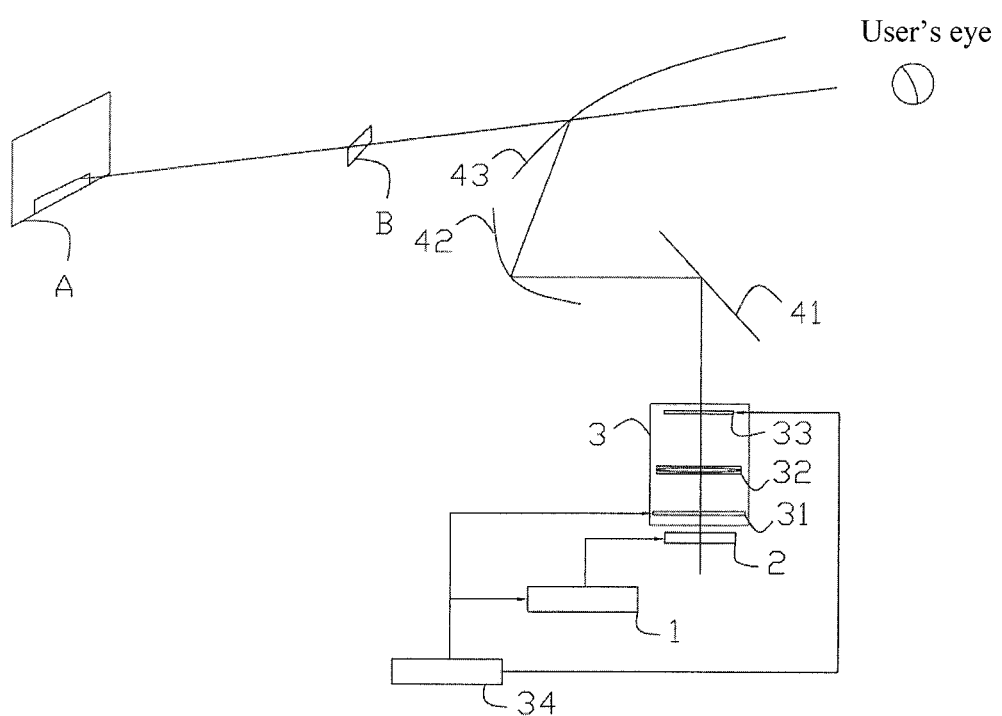
FIG. 1 is a schematic structural diagram of a display apparatus according to an embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-8. When referring to the figures, like structures and elements shown throughout are indicated with like reference numerals.

Although the existing head-up display systems can project the image to be displayed on the windshield, the existing head-up display systems generally need to use a large number of mirrors. Furthermore, the structure of the existing head-up display systems is relatively complicated, and the energy consumption thereof is relatively large.

To enable those skilled in the art to better understand technical solution of the present disclosure, a display apparatus, a display method, and a head-up display apparatus provided by the present disclosure are described in detail below with reference to the accompanying drawings.

A first embodiment of the present disclosure is a display apparatus. As shown in FIG. 1, the display apparatus includes a display unit 2 and an image processing unit 3. The display unit 2 is used for projecting light for creating a display image. The image processing unit 3 is used for receiving the light for the display image projected by the display unit 2, changing polarization direction of the light for the display image, and selectively scattering or transmitting the light for the display image based on the polarization direction of the light for the display image so as to make the display image to be displayed at different distances from the user.

The display unit may be a projection, a liquid crystal display (LCD), an organic light-emitting diode (OLED), or any apparatus which can show a picture or video.

Compared with the prior art, the display apparatus provided by the first embodiment of the present disclosure eliminates the need for using a large number of mirrors, thereby simplifying structure and reducing energy consumption.

In practical application, the image to be displayed may be sent to the display unit 2 through an image rendering unit 1. Before the image to be displayed is sent, the image rendering unit 1 can change the image based on the required polarization state. If the required polarization state is different, the image is also different.

The structure and function of the image processing unit 3 will be described in detail below. In one embodiment, the image processing unit 3 includes a first polarization conversion element 31, a first lens element 32, and a liquid crystal dispersing element 33.

In one embodiment, the first polarization conversion element 31 is configured to convert the polarization direction of the light for the display image from the display unit 2 into a first polarization direction or a second polarization direction. The first polarization direction and the second polarization direction may be perpendicular to each other.

In one embodiment, the first lens element 32 is configured to receive the light for the display image after its polarization direction is converted and to deflect the light of the first polarization direction. The first lens element 32 does not change direction of the light of the second polarization direction.

Figure 2:
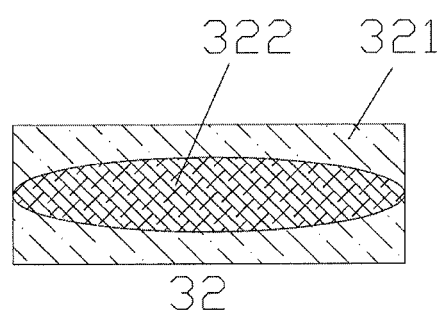
FIG. 2 is a schematic structural diagram of a lens element according to an embodiment of the present disclosure.

In one embodiment, as shown in FIG. 2, the first lens element 32 specifically includes a birefringent lens. The birefringent lens includes a hollow refractive material 321 and a filler 322 filled in the hollow refractive material 321. The refractive material 321 may adopt a plate-like structure. The refractive indices of the refractive material 321 and the filler 322 with respect to incident light of the first polarization direction are different from each other, and the refractive index of the refractive material 321 is smaller than that of the filler 322 so as to converge the incident light of the first polarization direction. As such, the incident light of the first polarization direction can be converged toward the liquid crystal dispersing element 33. The refraction material 321 and the filler 322 have the same refractive index with respect to incident light of the second polarization direction so as not to deflect the incident light of the second polarization direction. As such, the incident light of the second polarization direction can directly pass through the first lens element 32 without changing the direction.

In one embodiment, the liquid crystal dispersing element 33 is configured to scatter the light of the first polarization direction deflected by the first lens element 32. That is, the liquid crystal dispersing element 33 forms an object surface capable of displaying an image. Alternatively, the liquid crystal dispersing element 33 transmits the light of the second polarization direction from the first lens element 32. The first lens element 32 does not change the direction of the light of the second polarization. That is, the light of the second polarization direction directly passes through the first lens element 32 and then the liquid crystal dispersing element 33.

In one embodiment, the image processing unit 3 may further include a control unit 34 for controlling operation of the liquid crystal dispersing element 33. Of course, the image processing unit 3 may also be used for controlling operation of the display unit 2 and the first polarization conversion element 31.

Figure 3A:
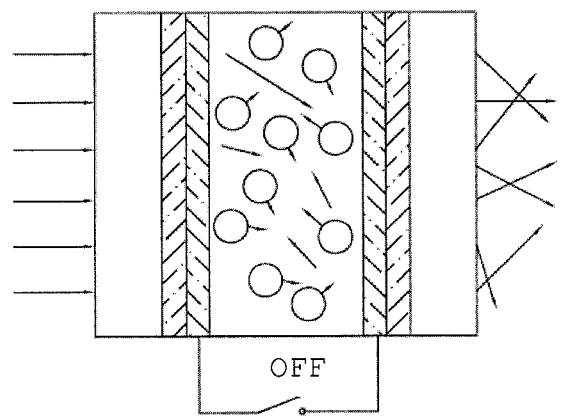
FIG. 3A is a schematic diagram of a polymer dispersed liquid crystal element in which the power is off according to an embodiment of the present disclosure.
Figure 3B:
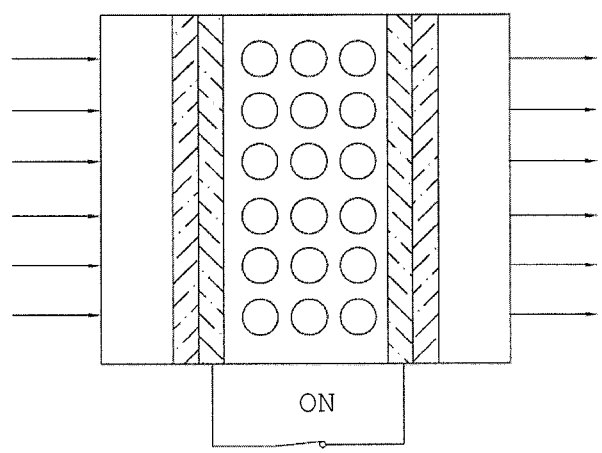
FIG. 3B is a schematic diagram of a polymer dispersed liquid crystal element in which the power is on according to an embodiment of the present disclosure.

In one embodiment, the liquid crystal dispersing element 33 may specifically include a Polymer Dispersed Liquid Crystal (PDLC) element. As shown in FIGS. 3A and 3B, the PDLC element includes a Liquid Crystal (LC) composite, which is formed by mixing liquid crystal microdroplets and monomers of a polymer at a certain ratio. Applying an external electric field or a magnetic field to the liquid crystal composite can change the liquid crystal composite from an opaque state to a transparent state. Based on this, the control unit 34 controls the PDLC element to turn off the power so that the LC composite can be in a scattering state, as shown in FIG. 3A. At this time, the LC composite is in an opaque state so that the light of the first polarization direction can be scattered. Alternatively, the control unit 34 controls the Polymer Dispersed Liquid Crystal element to be turned on power, as shown in FIG. 3B. At this time, the LC composite is in a transparent state to transmit the light of the second polarization direction. The above Polymer Dispersed Liquid Crystal element has advantages such as simple structure and small energy consumption.

Figure 4A:
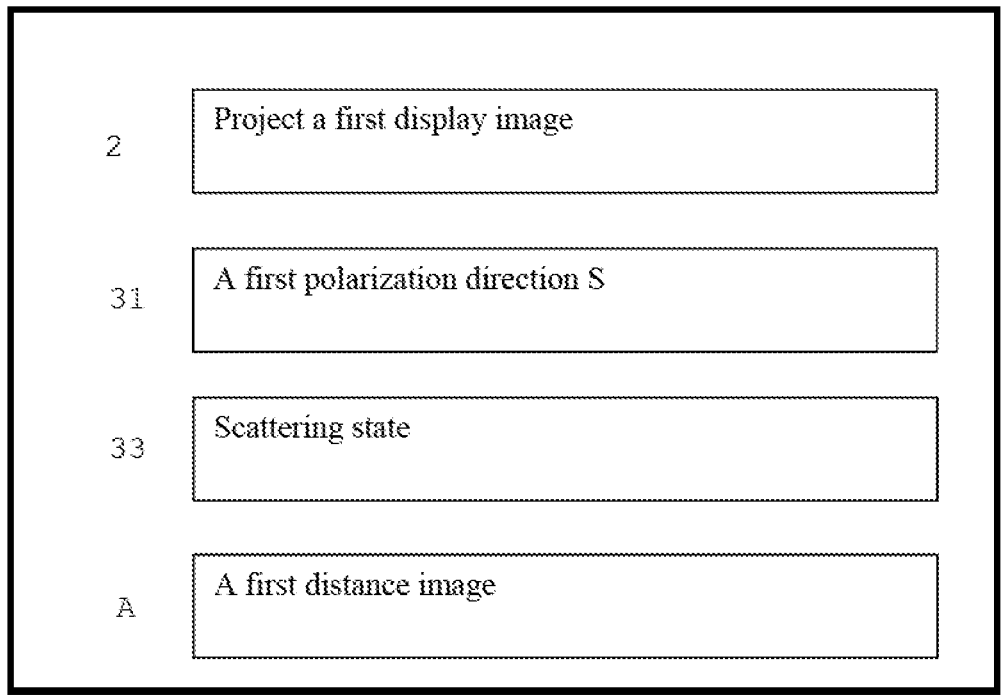
FIG. 4A is a schematic diagram of the status of each of the elements in a first distance display mode according to an embodiment of the present disclosure.

In one embodiment, as shown in FIG. 1, the image processing unit 3 can realize display of a first distance image A at a first distance or a second distance image B at a second distance. In one embodiment, if the first distance image A needs to be displayed at the first distance, as shown in FIG. 4A, the display unit 2 projects light for the first display image, and the first display image corresponds to the first distance image A. At the same time, the first polarization conversion element 31 converts the polarization direction of the light for the first display image from the display unit 2 into the first polarization direction S. The first lens element 32 deflects the light of the first polarization direction S and converges the light to the liquid crystal dispersing element 33. At the same time, the control unit 34 controls the liquid crystal dispersing element 33 to be turned off and in a scattering state, thereby scattering the light of the first polarization direction S.

Figure 4B:
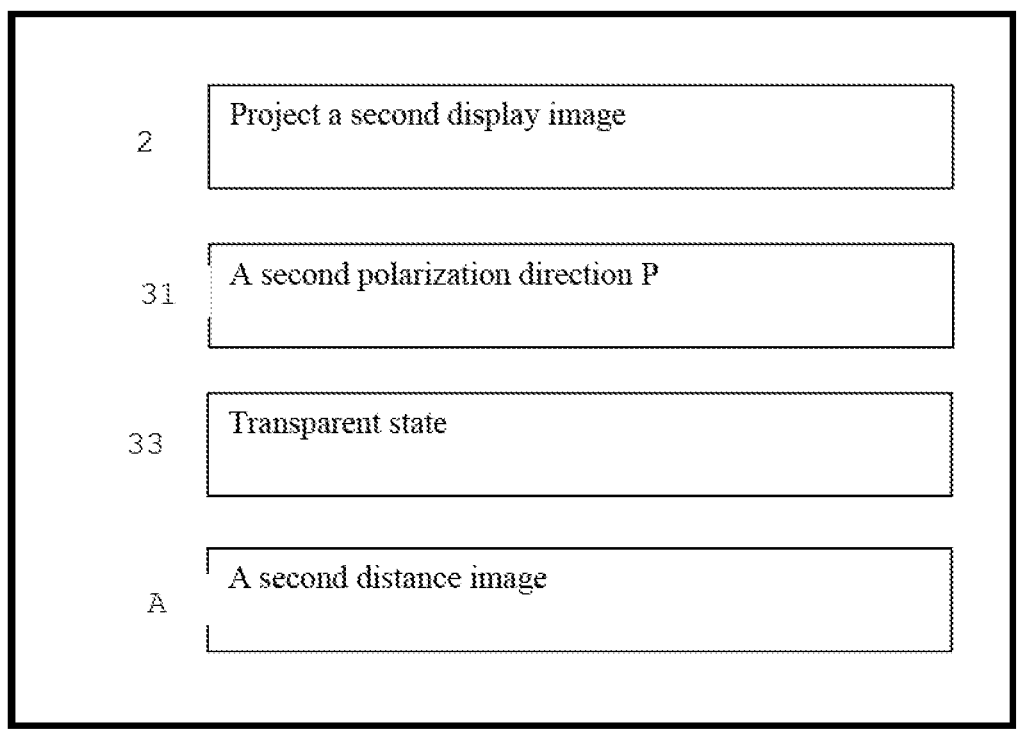
FIG. 4B is a schematic diagram of the status of each of the elements in a second distance display mode according to an embodiment of the present disclosure.

In another embodiment, if the second distance image B needs to be displayed at the second distance, as shown in FIG. 4B, the display unit 2 projects light of the second display image, and the second display image corresponds to the second distance image B. At the same time, the first polarization conversion element 31 converts the polarization direction of the light for the second display image from the display unit 2 into the second polarization direction P. The first lens element 32 does not deflect the light of the second polarization direction P and the light of the second polarization direction P can directly pass through the first lens element 32 without changing the direction. At the same time, the control unit 34 controls the liquid crystal dispersing element 33 to be turned on and in the transparent state so that the light of the second polarization direction P can directly pass through the liquid crystal dispersing element 33.

In one embodiment, the display apparatus can display the first distance image A and the second distance image B simultaneously. Specifically, the display unit 2 alternately projects light for the first display image and light for the second display image according to a timing diagram. When the display unit 2 projects the light for the first display image, the first polarization conversion element 31 converts polarization direction of the light for the first display image into the first polarization direction S. When the display unit 2 projects the light for the second display image, the first polarization conversion element 31 converts polarization direction of the light for the second display image into the second polarization direction P.

Figure 4C:
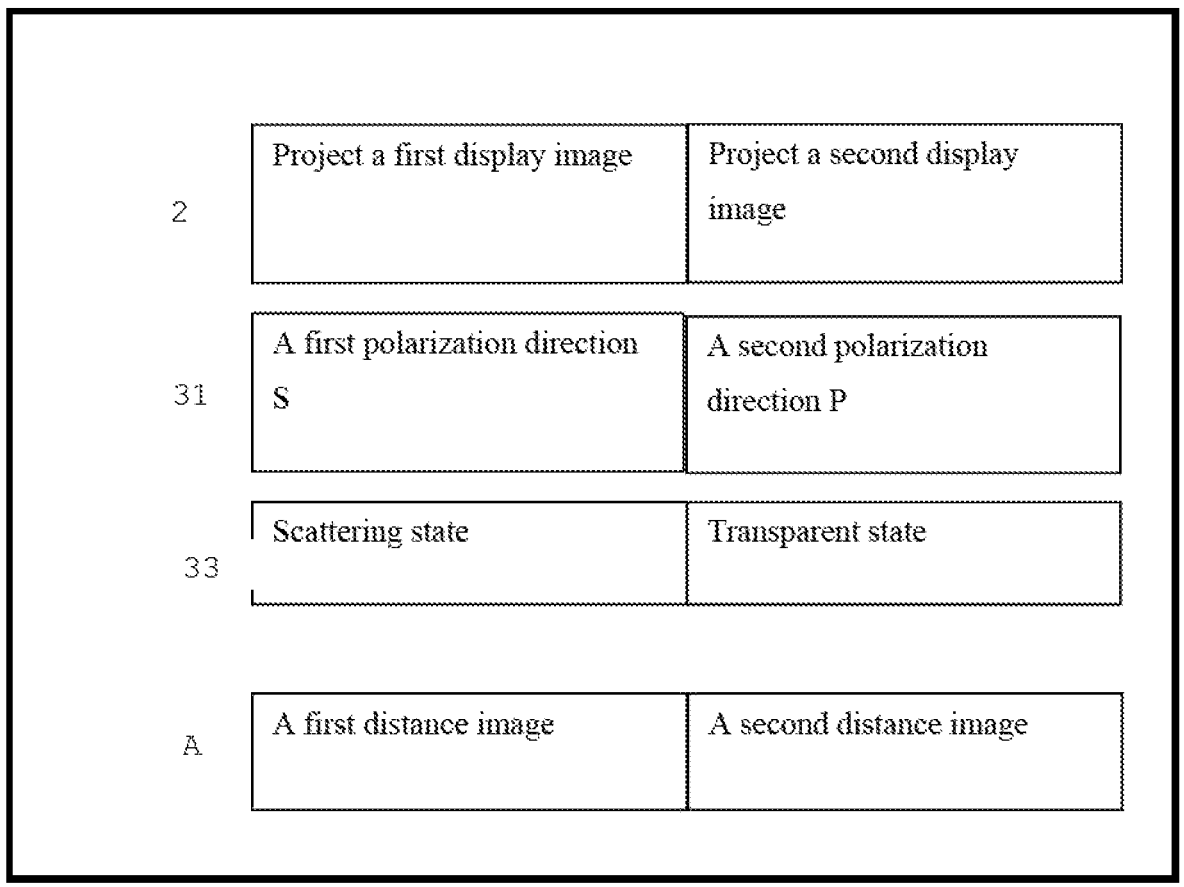
FIG. 4C is a schematic diagram of the status of each of the elements in a dual-distance display mode according to an embodiment of the present disclosure.

As shown in FIG. 4C, the display image includes a first display image and a second display image. The display unit 2 alternately projects the first display image and the second display image according to a timing diagram. In order to avoid overlapping, positions of the first display image and the second display image on the projection area of the display unit 2 may be different.

At the same time, the first polarization conversion element 31 converts polarization direction of the light for the first display image into the first polarization direction S when the display unit 2 projects the first display image. When the display unit 2 projects the second display image, the first polarization conversion element 31 converts polarization direction of the light for the second display image into the second polarization direction P. Then, the first lens element 32 deflects the light of the first polarization direction S or does not change the direction of the light of the second polarization direction P. The liquid crystal dispersing element 33 alternately switches between a scattering state and a transparent state under the control of the control unit 34 to respectively scatter the light of the first polarization direction S or transmit the light of the second polarization direction P. As such, the first distance image A and the second distance image B are displayed at the first distance and the second distance respectively. It should be noted that the period during which the first display image and the second display image are alternately projected is much shorter than the refresh time (1/30 second) of the human eyes, so that the user can visually see two distance images simultaneously.

Figure 5:
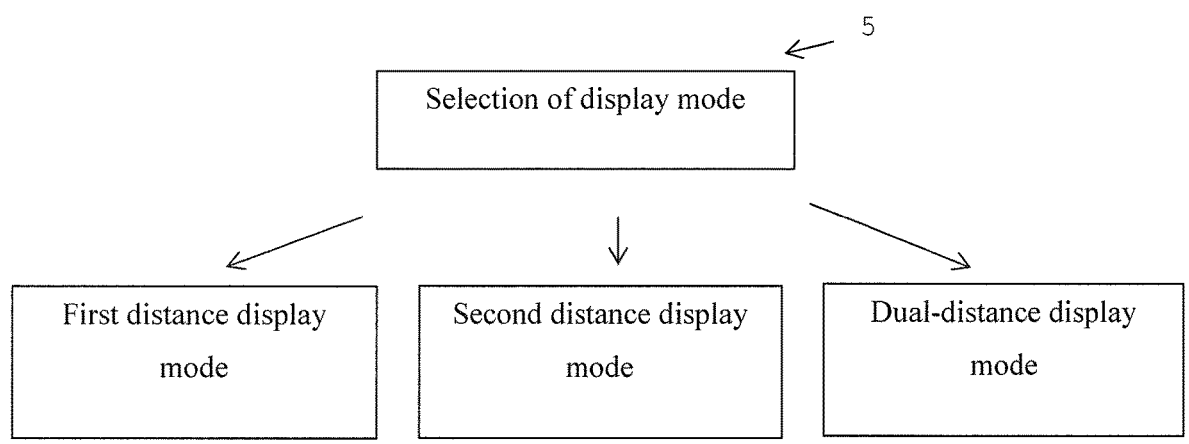
FIG. 5 is a flow chart of selection of a display mode according to an embodiment of the present disclosure.

In one embodiment, as shown in FIG. 5, the display apparatus further includes a mode selection unit 5 for receiving a display mode set by a user. The display mode includes a first distance display mode, a second distance display mode, and a dual-distance display mode. In the first distance display mode, the display apparatus can display the first distance image A at the first distance. In the second distance display mode, the display apparatus can display the second distance image B at the second distance. In the dual-distance display mode, the display apparatus can display the first distance image A and the second distance image B at the first distance and the second distance, respectively.

With the mode selection unit 5 described above, the user can choose to display a distance image at one of the distances according to a specific selection, or display two distance images at two distances at the same time, thereby improving display flexibility In one embodiment, the display unit 2 includes a projection area, part or all of which is for projecting a display image. The display unit 2 includes a plurality of display elements distributed over the entire projection area. The display images may be projected by a part of the display elements or may be projected by all the display elements so that the projection area of the display unit 2 can be fully utilized.

Figure 6:
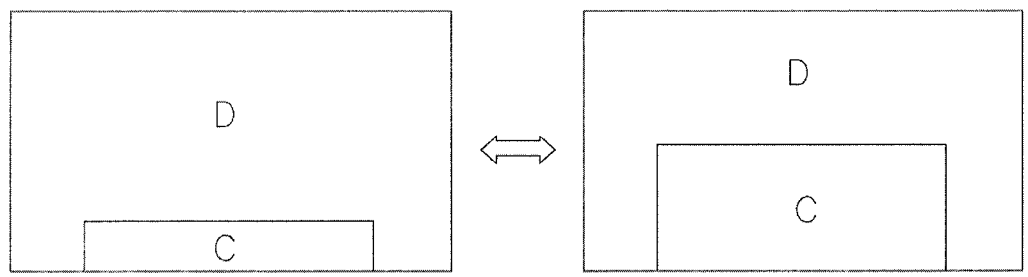
FIG. 6 is an area distribution of an image in a display area according to an embodiment of the present disclosure.

For the dual-distance display mode, the position and/or size of the respective projected areas of the two display images C and D on the display unit may be dynamically adjusted. As shown in FIG. 6, if the user feels that the first display image C as shown in the left figure of FIG. 6 is small, the first display image C may be enlarged by increasing the display area of the first display image C, as shown in the right figure of FIG. 6.

In one embodiment, the display apparatus further includes a first reflection unit including a first mirror assembly. The first reflection unit is used for reflecting the light of the first polarization direction S scattered by the liquid crystal dispersion element 33, and/or the light of the second polarization direction P transmitted through the liquid crystal dispersion element 33 to the user's eyes. As such, the user can observe the first distance image at the first distance or the second distance image at the second distance.

The display apparatus provided by the first embodiment of the present disclosure can be applied to a head-up display apparatus, which can be applied to, for example, a vehicle. In this case, the first mirror assembly described above includes a first mirror 41, a second mirror 42, and a first front windshield 43 of the vehicle. The first mirror 41, the second mirror 42, and the first front windshield 43 of the vehicle are used to reflect the light emerged from the liquid crystal dispersing element 33 to the user's eye in a horizontal view. As such, the driver need not look down at the meter display or the audio display during driving. Otherwise, in the event of an emergency, it is possible that the driver will have not enough time to take effective measures and accordingly an accident may occur.

Figure 7:
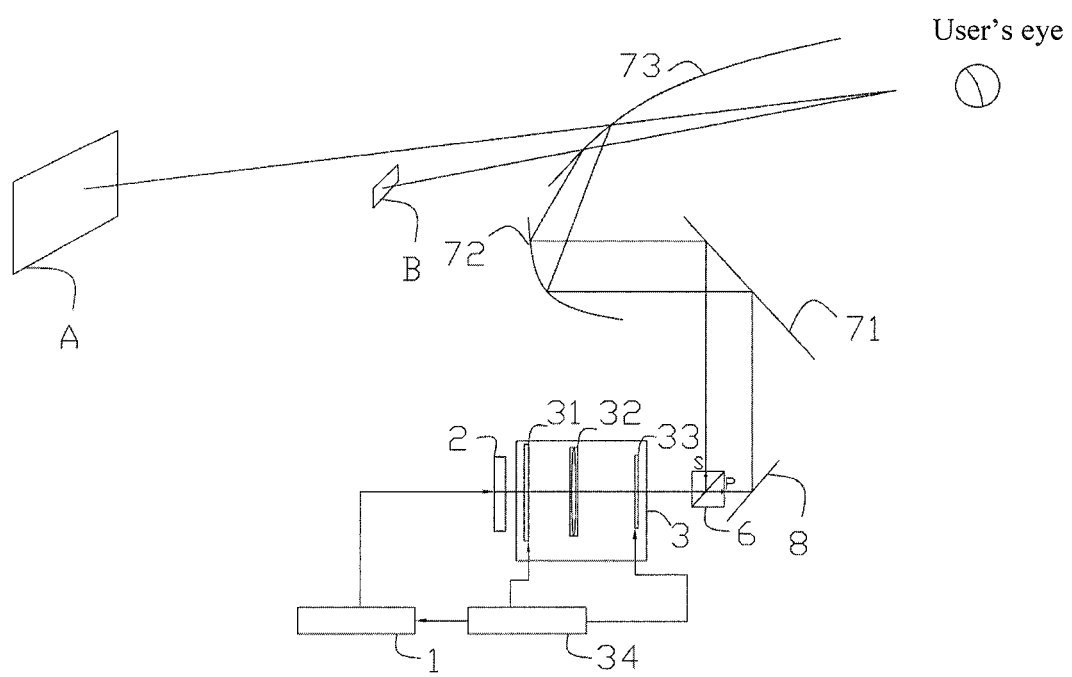
FIG. 7 is a schematic structural diagram of a display apparatus according to an embodiment of the present disclosure.

FIG. 7 shows a display apparatus according to a second embodiment of the present disclosure. As shown in FIG. 7, the display apparatus provided by the second embodiment of the present disclosure also includes a display unit 2 and an image processing unit 3 as that of the first embodiment described above. The structure and function of the display unit 2 and the image processing unit 3 are the same as those of the first embodiment described above, and details are not described herein again. The difference between this embodiment and the above first embodiment will be described in detail below.

In one embodiment, in addition to the display unit 2 and the image processing unit 3, the display apparatus further includes a first polarization beam splitter 6 and a second reflecting unit. The first polarization beam splitter 6 is disposed between the liquid crystal dispersing element 33 and the second reflecting unit for receiving the light of the first polarization direction scattered by the liquid crystal dispersing element 33 or the light of the second polarization direction transmitted by the liquid crystal dispersing element 33, and causing the exit direction of the light of the first polarization direction to be different from the exit direction of the light of the second polarization direction. For example, the exit direction of the light of the first polarization direction and the exit direction of the light of the second polarization direction can be perpendicular to each other. In this way, the first distance image A and the second distance image B can be separated from each other without overlapping. Correspondingly, the positions of the first display image and the second display image on the projection area of the display unit 2 may be the same.

In one embodiment, the second reflection unit includes a second mirror assembly and a third mirror assembly. The second mirror assembly includes a third mirror 71, a fourth mirror 72, and a second front windshield 73 of the vehicle for reflecting the light of the first polarization direction emitted by the first polarization beam splitter 6 to the user's eye. The third mirror assembly includes a fifth mirror 8 for reflecting the light of the second polarization direction emitted by the first polarization beam splitter 6 to the third reflecting mirror 71, and the light of the second polarization direction is then reflected into the user's eye by the second mirror assembly. As such, the two distance images seen by the user are separated from each other, and no overlapping occurs. In practice, the number of the mirrors in the second mirror assembly can be more than two according to specific situation.

Figure 8:
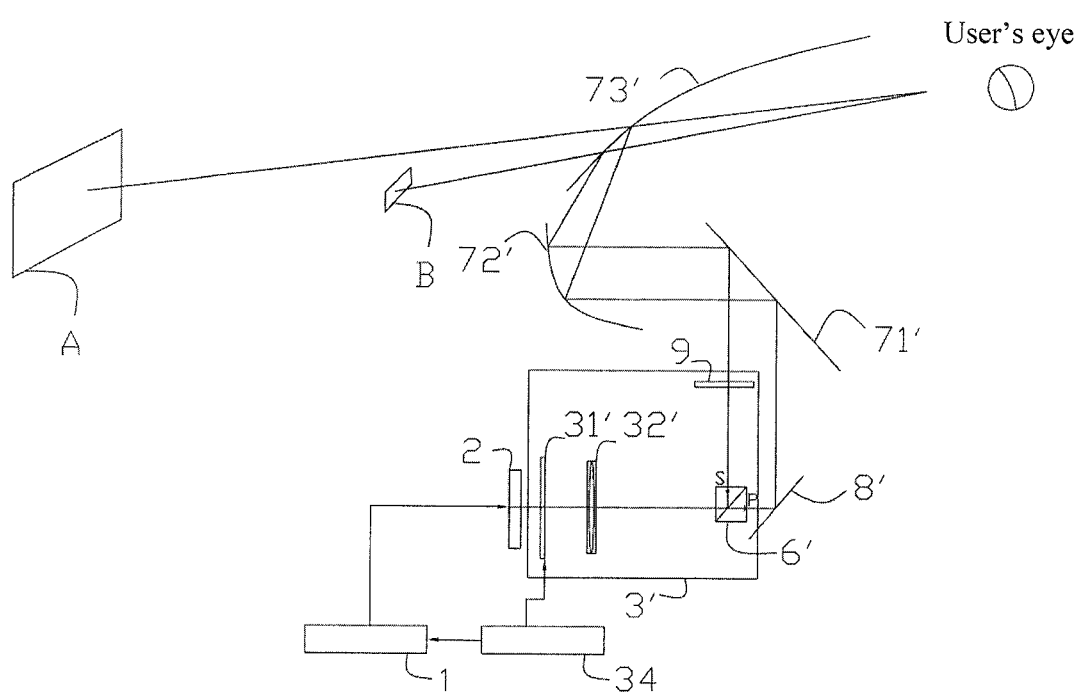
FIG. 8 is a schematic structural diagram of a display apparatus according to an embodiment of the present disclosure.

FIG. 8 shows a display apparatus according to a third embodiment of the present disclosure. As shown in FIG. 8, compared with the above first and second embodiments, the display apparatus provided by the third embodiment of the present disclosure also includes the display unit 2 and the image processing unit 3. However, the image processing unit has a different structure. The difference between this embodiment and the above first and second embodiments will be described in detail below.

In one embodiment, the image processing unit 3' includes a second polarization conversion element 31' and a second lens element 32'.

The second polarization conversion element 31' is configured to convert the polarization direction of the light for the display image into the first polarization direction S or the second polarization direction P.

The second lens element 32' is configured to receive the light for the display image after the conversion and to deflect the light of the first polarization direction S. The second lens element 32' does not change the direction of the light of the second polarization direction P.

The structure and function of the second polarization conversion element 31' and the second lens element 32' are the same as those of the first polarization conversion element 31 and the second lens element 32 in the first and second embodiments as described above, and thus are not repeated here.

The second polarization beam splitter 6' is configured to cause the exit direction of the light of the first polarization direction S after being deflected by the second lens element 32' to be different from the exit direction of the light of the second polarization unchanged from the second lens element 32'.

The scattering element 9 is configured to receive the light of the first polarization direction S emitted by the second polarization beam splitter 6' and scatter the light of the first polarization direction S.

It can be seen from the foregoing that the display apparatus provided in this embodiment differs from that in the above second embodiment only in that the liquid crystal dispersing element 33 is removed and the polarization beam splitter is disposed after the second lens element 32' to receive the emergent light of the second lens element 32'. At the same time, a scattering element 9 is added between the polarization beam splitter and the second reflecting mirror assembly for scattering the light of the first polarization direction S deflected by the first lens element 32'. The light of the second polarization direction P emitted by the second polarization beam splitter 6' does not pass through the scattering element 9.

In one embodiment, the display apparatus further includes a third reflection unit. The third reflection unit includes a fourth mirror assembly and a fifth mirror assembly. The fourth mirror assembly includes a sixth mirror 71', a seventh mirror 72', and a third front windshield 73' of the vehicle for reflecting to the user's eye the light of the first polarization direction scattered by the scattering element 9. The fifth mirror assembly includes an eighth mirror 8' for reflecting the light of the second polarization direction emitted by the second polarization beam splitter 6' to the sixth mirror 71' of the fourth mirror assembly and then the light of the second polarization direction is reflected to the user's eye by the fourth mirror assembly. In this way, the two distance images seen by the user are separated from each other, and do not overlap with each other.

The display apparatus provided by the present embodiment can also realize that the display image observed by the user is formed at different distances while the liquid crystal dispersing element 33 is removed, thereby further simplifying the structure and reducing energy consumption.

In the display apparatuses provided by the above embodiments of the present disclosure, there is no need for a large number of mirrors, thereby simplifying the structure and reducing energy consumption.

Another example of the present disclosure is a display method. The display method may include the following:

In step 1, light for a display image is projected.

In step 2, polarization state of the light for the display image is changed, and the light for the display image is selectively scattered or transmitted based on the different polarization state of the light for the display image so that the display image is observed by the user to be displayed at different distances.

Compared with the prior art, the display method provided by the present disclosure can simplify the structure and reduce energy consumption.

In one embodiment, the above step 2 includes the following:

In step 21, the polarization direction of the light for the display image is converted into the first polarization direction or the second polarization direction.

In step 22, the light for the display image after the conversion is received, and the light of the first polarization direction is deflected or the direction of the light of the second polarization direction is not changed.

In step 23, the deflected light of the first polarization direction is scattered or the unchanged light of the second polarization direction is transmitted.

In another embodiment, the above step 2 includes the following:

In step 21', the polarization direction of the light for the display image is converted into the first polarization direction or the second polarization direction.

In step 22', the light for the display image after the conversion is received, and the light of the first polarization direction is deflected or the direction of the light of the second polarization direction is not changed.

In step 23', the exit direction of the light of the first polarization direction is caused to be different from the exit direction of the light of the second polarization direction.

In step 24', the light of the first polarization direction is scattered.

In one embodiment, the display image includes a first display image and a second display image.

The light for the first display image or the light for the second display image is projected or the light for the first display image and the light for the second display image are alternatively projected according to a timing diagram.

When the light for the first display image is projected, polarization direction of the light for the first display image is converted to be the first polarization direction.

When the light for the second display image is projected, polarization direction of the light for the second display image is converted to be the second polarization direction.

In this way, the first distance image and the second distance image can be displayed respectively at the first distance and the second distance at the same time.

In one embodiment, after the above step 23, the display method further includes the following:

The light of the first polarization direction and the light of the second polarization direction are received, and the exiting direction of the light of the first polarization direction is caused to be different from the exiting direction of the light of the second polarization direction. As such, the first distance image and the second distance image can be separated from each other without overlapping.

In one embodiment, the display method further includes the following:

A display mode set by a user is received. The display mode includes a first distance display mode, a second distance display mode, and a dual-distance display mode.

In the first distance display mode, the display method includes the following:

The light for the first display image is projected. The polarization state of the light for the first display image is converted into the first polarization direction and the light for the first display image is scattered to display the first distance image at the first distance.

In the second distance display mode, the display method includes the following:

The light for the second display image is projected. The polarization state of the light for the second display image is converted into the second polarization direction and the light for the second display image is transmitted to display the second distance image at the second distance.

In the dual-distance display mode, the display method includes the following:

The light for the first display image and the light for the second display image are alternately projected according to a timing diagram.

When the light for the first display image is projected, the polarization state of the light for the first display image is converted into a first polarization direction, and the light for the first display image is scattered. When the light for the second display image is projected, the polarization state of the light for the second display image is converted into a second polarization direction, and the light for the second display image is transmitted. Accordingly, the first distance image and the second distance image are displayed at the first distance and the second distance respectively.

In this way, the user can choose to display a distance image at one of the distances according to a specific selection or display two distance images at two distances at the same time, thereby improving display flexibility.

Another example of the present disclosure is a head-up display apparatus. The head-up display apparatus includes the display apparatus provided in the above description and embodiments of the present disclosure. The head-up display apparatus can display an image in front of a user's eye in a head-up view.

The head-up display apparatus provided by the present disclosure adopts the above display apparatus provided by the description and various embodiments of the present disclosure, thereby simplifying the structure and reducing the power consumption.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A display apparatus, comprising
   a display unit; and
   an image processing unit,
   wherein the display unit is configured to project light for a display image; and the image processing unit is configured to change polarization direction of the light for the display image and to selectively scatter or transmit the light for the display image based on the polarization direction of the light for the display image;
   the image processing unit comprises a first polarization conversion element, a first lens element, and a liquid crystal dispersing element;
   the first polarization conversion element is configured to convert the polarization direction of the light for the display image into a first polarization direction or a second polarization direction;
   the first lens element is configured to deflect the light of the first polarization direction and not to change direction of the light of the second polarization direction;
   the liquid crystal dispersing element is configured to scatter the light of the first polarization direction and transmit the light of the second polarization direction; and
   the first lens element comprises a birefringent lens, the birefringent lens comprising a hollow refractive material and a filler, a refractive index of the hollow refractive material being smaller than that of the filler with respect to incident light of the first polarization direction, and the refractive index of the hollow refraction material being the same as that of the filler with respect to incident light of the second polarization direction.

2. The display apparatus according to claim 1, wherein the display apparatus is configured to display the display image at different distances from a user.

3. The display apparatus according to claim 1, the image processing unit further comprising a first polarization beam splitter,
   wherein the first polarization beam splitter is configured to receive the light of the first polarization direction scattered by the liquid crystal dispersing element or the light of the second polarization direction transmitted by the liquid crystal dispersing element, and to cause an exit direction of the light of the first polarization direction to be different from an exit direction of the light of the second polarization direction.

4. The display apparatus according to claim 1, wherein the image processing unit comprises a second polarization conversion element, a second lens element, a second polarization beam splitter, and a scattering element,
wherein the second polarization conversion element is configured to convert the polarization direction of the light for the display image into a first polarization direction or a second polarization direction;
the second lens element is configured to deflect the light of the first polarization direction and not to change direction of the light of the second polarization direction; and
the scattering element is configured to scatter the light of the first polarization direction emitted by the second polarization beam splitter.

5. The display apparatus according to claim 1, wherein the display unit projects light for a first display image, light for a second display image, or light for the first display image and light for the second display image alternatively according to a timing diagram; and
in case that the display unit projects the light for the first display image, the first polarization conversion element or the second polarization conversion element converts the polarization direction of the light for the first display image into the first polarization direction, and in case that the display unit projects the light for the second display image, the first polarization conversion element or the second polarization conversion element converts the polarization direction of the light for the second display image into the second polarization direction.

6. The display apparatus according to claim 1, further comprising a control unit, wherein the liquid crystal dispersing element comprises a polymer dispersed liquid crystal element, and the control unit is configured to turn on the polymer dispersed liquid crystal element to scatter the light of the first polarization direction or turn off the polymer dispersed liquid crystal element to transmit the light of the second polarization direction.

7. The display apparatus according to claim 1, further comprising a first reflection unit including a first mirror assembly, wherein the first reflection unit is configured to reflect the light of the first polarization direction scattered by the liquid crystal dispersion element and/or the light of the second polarization direction transmitted through the liquid crystal dispersion element to form the display image at different distances from an user, respectively.

8. The display apparatus according to claim 1, further comprising a second reflection unit including a second mirror assembly and a third mirror assembly,
wherein the second mirror assembly is configured to reflect the light of the first polarization direction emitted by the first polarization beam splitter to form the display image; and
the third mirror assembly is configured to reflect the light of the second polarization direction emitted by the first polarization beam splitter to the second mirror assembly.

9. The display apparatus according to claim 4, further comprising a third reflection unit including a fourth mirror assembly and a fifth mirror assembly,
wherein the fourth mirror assembly is configured to reflect the light of the first polarization direction scattered by the scattering element to form the display image; and
the fifth mirror assembly is configured to reflect the light of the second polarization direction emitted by the second polarization beam splitter to the fourth mirror assembly.

10. The display apparatus according to claim 1, further comprising a mode selection unit,
wherein the mode selection unit is configured to select a display mode, the display mode including a first distance display mode, a second distance display mode, and a dual-distance display mode.

11. The display apparatus according to claim 10, wherein in the first distance display mode, the display unit projects light for a first display image; the image processing unit converts polarization direction of the light for the first display image into the first polarization direction and scatters the light for the first display image to display the first display image at a first distance;
in the second distance display mode, the display unit projects light for a second display image; the image processing unit converts the polarization direction of the light for the second display image into the second polarization direction and transmits the light for the second display image to display the second display image at a second distance; and
in the dual-distance display mode, the display unit projects light for the first display image and light for the second display image alternatively, and the image processing unit displays the first display image and the second display image at the first distance and the second distance, respectively.

12. A head-up display apparatus comprising the display apparatus according to claim 1.

13. A display method of a display apparatus, comprising:
projecting a light for a display image; and
changing polarization direction of the light for the display image and selectively scattering or transmitting the light for the display image based on the polarization direction of the light for the display image;
wherein the display apparatus includes a display unit and an image processing unit;
the display unit is configured to project light for a display image; and the image processing unit is configured to change polarization direction of the light for the display image and to selectively scatter or transmit the light for the display image based on the polarization direction of the light for the display image;
the image processing unit comprises a first polarization conversion element, a first lens element, and a liquid crystal dispersing element;
the first polarization conversion element is configured to convert the polarization direction of the light for the display image into a first polarization direction or a second polarization direction;
the first lens element is configured to deflect the light of the first polarization direction and not to change direction of the light of the second polarization direction;
the liquid crystal dispersing element is configured to scatter the light of the first polarization direction and transmit the light of the second polarization direction; and
the first lens element comprises a birefringent lens, the birefringent lens comprising a hollow refractive material and a filler, a refractive index of the hollow refractive material being smaller than that of the filler with respect to incident light of the first polarization direction, and the refractive index of the hollow refraction material being the same as that of the filler with respect to incident light of the second polarization direction.

14. The display method according to claim 13, wherein changing polarization direction of the light for the display image and selectively scattering or transmitting the light for the display image based on the polarization direction of the light for the display image comprises:
- converting the polarization direction of the light for the display image into a first polarization direction or a second polarization direction;
- deflecting the light of the first polarization direction and/or maintaining the direction of the light of the second polarization direction; and
- scattering the deflected light of the first polarization direction and/or transmitting the light of the second polarization direction.

15. The display method according to claim 13, wherein changing polarization direction of the light for the display image and selectively scattering or transmitting the light for the display image based on the polarization direction of the light for the display image comprises:
- converting the polarization direction of the light for the display image into a first polarization direction or a second polarization direction;
- deflecting the light of the first polarization direction and/or maintaining the direction of the light of the second polarization direction;
- causing an exit direction of the light of the first polarization direction to be different from an exit direction of the light of the second polarization direction; and
- scattering the light of the first polarization direction.

16. The display method according to claim 14, wherein the display image comprises a first display image and a second display image, the display method comprising:
- projecting a light for the first display image, a light for the second display image, or the light for the first display image and the light for the second display image alternatively;
- converting polarization direction of the light for the first display image into the first polarization direction in case that the light for the first display image is projected; and
- converting polarization direction of the light for the second display image into the second polarization direction in case that the light for the second display image is projected.

17. The display method according to claim 16, further comprising:
- selecting one of display modes, and the display modes including a first distance display mode, a second distance display mode, and a dual-distance display mode.

18. The display method according to claim 17, wherein in the first distance display mode, the display unit projects the light for the first display image; the image processing unit converts polarization direction of the light for the first display image into the first polarization direction and scatters the light for the first display image to display the first display image at a first distance;
in the second distance display mode, the display unit projects the light for the second display image; the image processing unit converts the polarization direction of the light for the second display image into the second polarization direction and transmits the light for the second display image to display the second display image at a second distance; and
in the dual-distance display mode, the display unit projects the light for the first display image and the light for the second display image alternatively, and the image processing unit displays the first display image and the second display image at the first distance and the second distance respectively.

* * * * *